United States Patent
Fujiwara

(10) Patent No.: US 9,551,361 B2
(45) Date of Patent: Jan. 24, 2017

(54) TRAVEL CONTROL VALVE

(71) Applicant: KAYABA INDUSTRY CO., LTD., Tokyo (JP)

(72) Inventor: Takeshi Fujiwara, Kanagawa (JP)

(73) Assignee: KYB Corporation, Tokyo (JP)

( * ) Notice: Subject to any disclaimer, the term of this patent is extended or adjusted under 35 U.S.C. 154(b) by 287 days.

(21) Appl. No.: 14/384,398

(22) PCT Filed: Mar. 7, 2013

(86) PCT No.: PCT/JP2013/056329
§ 371 (c)(1),
(2) Date: Sep. 11, 2014

(87) PCT Pub. No.: WO2013/141037
PCT Pub. Date: Sep. 26, 2013

(65) Prior Publication Data
US 2015/0128583 A1    May 14, 2015

(30) Foreign Application Priority Data
Mar. 23, 2012 (JP) .................. 2012-068153

(51) Int. Cl.
*F15B 13/04* (2006.01)
*F15B 11/16* (2006.01)
(Continued)

(52) U.S. Cl.
CPC ......... *F15B 13/0402* (2013.01); *E02F 9/2239* (2013.01); *E02F 9/2267* (2013.01);
(Continued)

(58) Field of Classification Search
CPC ..... F15B 11/17; F15B 11/162; F15B 13/0402; F15B 2013/041; F15B 2013/0413; F15B 2211/20576; F15B 2211/30595; F15B 2211/40515; F15B 2211/41518; F15B 2211/5152; F15B 2211/7058; F15B 2211/7135; F15B 2211/7142; F16K 11/07; F16K 11/0716; E02F 9/2239; E02F 9/2267; E02F 9/2282; E02F 9/2292; E02F 9/2296; Y10T 137/8671
See application file for complete search history.

(56) References Cited

U.S. PATENT DOCUMENTS

2011/0146258 A1* 6/2011 Peters ................... F15B 11/162
60/422

FOREIGN PATENT DOCUMENTS

JP          3-39670 U      4/1991
JP       2004-100847 A    4/2004
(Continued)

*Primary Examiner* — Logan Kraft
(74) *Attorney, Agent, or Firm* — Rabin & Berdo, P.C.

(57) ABSTRACT

A travel control valve includes a valve body and a spool. The valve body includes a first pump port connected on an upstream side from a drive control valve, a first connection port connected on a downstream side from the drive control valve, a second pump port connected to a second pump, and a second connection port connected to a second circuit system. The travel control valve can switch a communication opening between the first pump port and the first connection port to a large opening throttle position in which the communication opening remains smaller than that between the second pump port and the second connection port, and a small opening throttle position in which the communication opening remains smaller than that in the large opening throttle position.

5 Claims, 6 Drawing Sheets

(51) Int. Cl.
*F15B 11/17* (2006.01)
*E02F 9/22* (2006.01)
*F16K 11/07* (2006.01)

(52) U.S. Cl.
CPC .......... *E02F 9/2282* (2013.01); *E02F 9/2285* (2013.01); *E02F 9/2292* (2013.01); *E02F 9/2296* (2013.01); *F15B 11/162* (2013.01); *F15B 11/17* (2013.01); *F16K 11/07* (2013.01); *F16K 11/0716* (2013.01); *F15B 2013/0413* (2013.01); *F15B 2211/20576* (2013.01); *F15B 2211/40515* (2013.01); *F15B 2211/41518* (2013.01); *F15B 2211/7058* (2013.01); *F15B 2211/7135* (2013.01); *F15B 2211/7142* (2013.01); *Y10T 137/8671* (2015.04)

(56) References Cited

FOREIGN PATENT DOCUMENTS

| JP | 2006-341732 A | 12/2006 |
| JP | 2009-013753 A | 1/2009 |
| JP | 2010-156135 A | 7/2010 |

* cited by examiner

TRAVEL CONTROL VALVE

TECHNICAL FIELD

The present invention relates to a travel control valve of a power shovel.

BACKGROUND ART

A crawler type travelling body and a wheel type travelling body disclosed in JP2006-341732A are each known as a travelling body of a power shovel.

In a power shovel including the crawler type travelling body, fluid pressure motors are connected to respective crawlers arranged on both sides of the power shovel. These fluid pressure motors independently drive the respective crawlers.

In a power shovel including the wheel type travelling body, fluid pressure motors are connected to respective drive wheels arranged on both sides of the power shovel. These fluid pressure motors independently drive the respective drive wheels.

A fluid pressure circuit of each of the power shovels includes a first pump and a second pump. The first pump and the second pump are connected to a first circuit system and a second circuit system, respectively. One fluid pressure motor is connected to the first pump through a drive control valve arranged in the first circuit system, whereas the other fluid pressure motor is connected to the second pump through a drive control valve arranged in the second circuit system.

The power shovel with the crawler travelling body includes a travel control valve. When the power shovel is travelling in a straight line, flow paths are switched by the travel control valve to connect the two fluid pressure motors in parallel with respect to the first pump. This enables the two fluid pressure motors to be driven by one pump, thereby preventing a pressure difference between the fluid pressure motors.

The power shovel with the wheel type travelling body also includes a travel control valve. This travel control valve throttles a passage connecting the first pump and the first circuit system, and connects the second pump and the second circuit system without throttling. This prevents a pressure difference between the fluid pressure motors due to a shortage of the pressure fluid supplied to the fluid pressure motor of the first circuit system, the pressure fluid shortage being caused by driving a large-load actuator arranged in the first circuit system.

SUMMARY OF INVENTION

Control circuits for operating actuators for the crawler type power shovel and the wheel type power shovel are embedded into the same valve block, so that compatibility between the crawler type power shovel and the wheel type power shovel can be provided.

In such a case, in the crawler type power shovel, a travel control valve includes a valve body and a spool embedded into the valve body, and flow paths can be switched according to a movement of the spool.

Moreover, in the wheel type power shovel, a travel control valve includes a valve body, and a fixed spool which is embedded into the valve body and does not move.

In the wheel type power shovel, however, a first pump always communicates with a control valve of a work machine system through a throttle of the travel control valve during the travel of the power shovel. This causes the pressure fluid to tend not to be supplied to the actuator having a large load while the power shovel is travelling. For example, since a load of a rotation motor is greater than that of the fluid pressure motor for travel, the pressure fluid does not tend to be supplied to the rotation motor if the rotation motor is driven while the power shovel is travelling.

An object of the present invention is to provide a travel control valve capable of more reliably operating an actuator having a large load in a power shovel including a wheel type travelling body even when the power shovel is travelling.

According to one aspect of the present invention, a travel control valve used in a power shovel includes a first circuit system that is connected to at least one control valve for operating an actuator and connected to a drive control valve for controlling a fluid pressure motor for driving a wheel type travelling body on an uppermost stream, a first pump that is connected to the first circuit system and adapted to supply a working fluid, a second circuit system that is connected to at least one control valve for operating an actuator, a second pump that is connected to the second circuit system and adapted to supply a working fluid; a valve body; and a spool that is slidably arranged inside the valve body. The valve body includes a first pump port that is connected to the first pump on an upstream side from the drive control valve, a first connection port that communicates with the first pump port and is connected on a downstream side from the drive control valve of the first circuit system, a second pump port that is connected to the second pump, and a second connection port that communicates with the second pump port and is connected to the second circuit system. A communication opening between the first pump port and the first connection port is switchable to a large opening throttle position in which the communication opening remains smaller than that between the second pump port and the second connection port and a small opening throttle position in which the communication opening remains even smaller than that in the large opening throttle position according to a slide position of the spool.

Embodiments of the present invention and advantages thereof are described in detail below with reference to the accompanying drawings.

DESCRIPTION OF EMBODIMENTS

Hereinafter, embodiments of the present invention will be described with reference to drawings.

Figure 1:
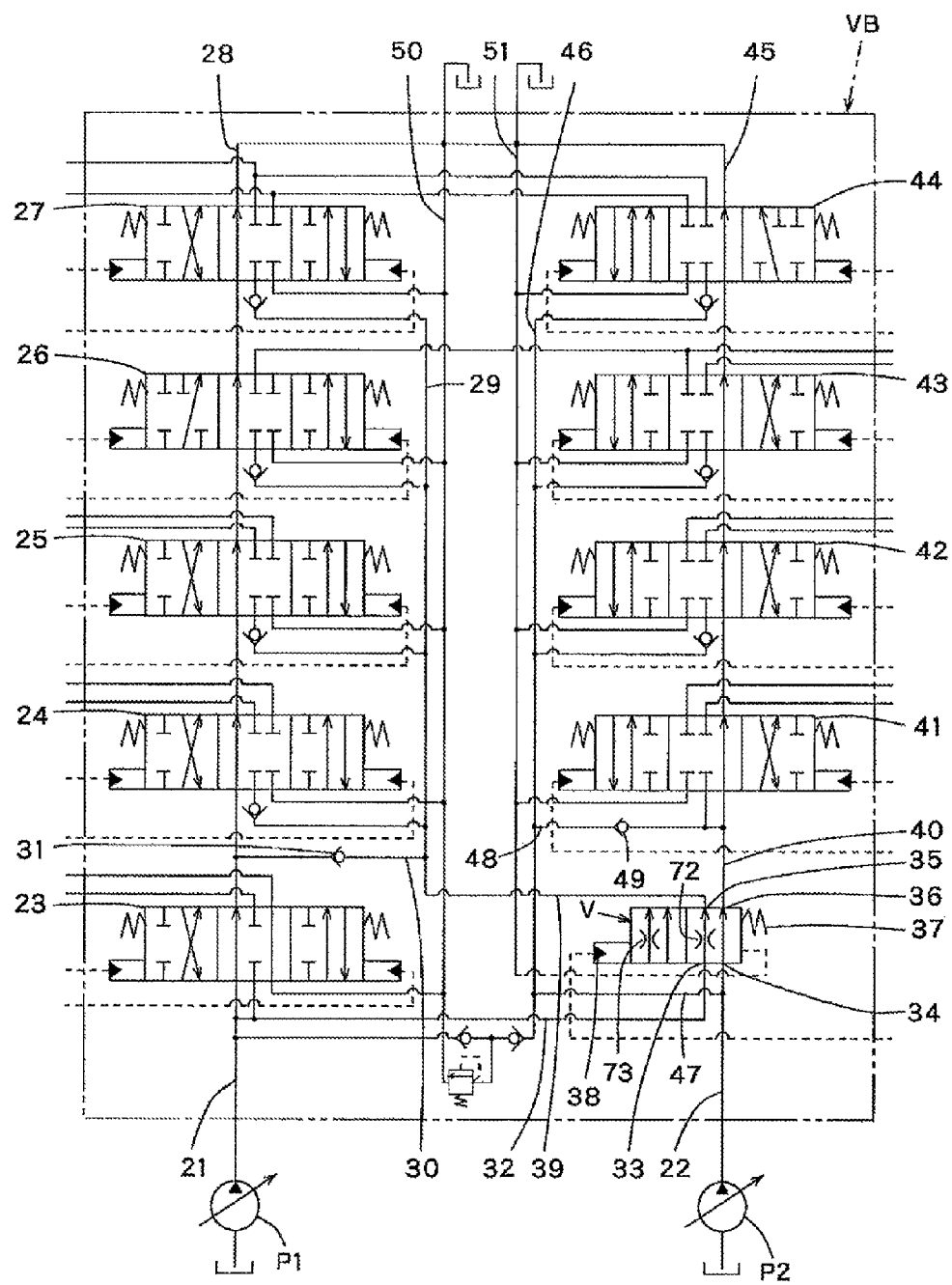
FIG. 1 is a circuit diagram of a power shovel according to an embodiment of the present invention.

FIG. 1 is a circuit diagram illustrating a control circuit of a power shovel according to the present embodiment. A pump passage 21 and a pump passage 22 are provided in a valve block VB. The pump passage 21 is connected to a first pump P1, and the pump passage 22 is connected to a second pump P2. The first pump P1 is connected to a first circuit system through the pump passage 21, whereas the second pump P2 is connected to a second circuit system through the pump passage 22.

In the first circuit system, a drive control valve 23 for controlling one fluid pressure motor, an auxiliary control valve 24 for controlling an auxiliary actuator, a rotation control valve 25 for controlling a rotation motor, a boom second-speed control valve 26 for controlling a boom cylinder, and an arm first-speed control valve 27 for controlling an arm cylinder are connected in this order from an upstream side. Hereinafter, the control valves 24 through 27 other than the drive control valve 23 are collectively referred to as "work machine system control valves 24 through 27". Each of the actuators connected to the work machine system control valves 24 through 27 is not illustrated for the sake of simplicity.

The drive control valve 23 and the work machine system control valves 24 through 27 are connected in tandem through a center bypass passage 28. Moreover, each of the work machine system control valves 24 through 27 is connected in parallel through a parallel path 29.

The center bypass passage 28 provided between the drive control valve 23 and the auxiliary control valve 24 communicates with the parallel passage 29 by a passage 30. The passage 30 includes a check valve 31 for allowing a flow only from the center bypass passage 28 to the parallel passage 29. A detour passage 32 is connected to the pump passage 21, and a travel control valve V is connected to the detour passage 32.

The travel control valve V includes a first pump port 33, a second pump port 34, a first connection port 35, and a second connection port 36. The travel control valve V is held in a neutral position on the right side of the figure by a spring force of a spring 37. On the other hand, a position of the travel control valve V is switched to a switching position on the left side of the figure when a pilot pressure acts on a pilot chamber 38 arranged on an opposite side of the spring 37.

The first pump port 33 is connected to the first pump P1 through the detour passage 32 and the pump passage 21. The second pump port 34 is connected to the second pump P2 through the pump passage 22. The first connection port 35 is connected to the parallel passage 29 of the first circuit system through a passage 39. The second connection port 36 is connected to the second circuit system through a passage 40.

In the second circuit system, a drive control valve 41 for controlling the other fluid pressure motor, a bucket control valve 42 for controlling a bucket cylinder, a boom first-speed control valve 43 for controlling a boom cylinder, and an arm second-speed control valve 44 for controlling an arm cylinder are connected in this order from an upstream side. Hereinafter, the control valves 42 through 44 other than the drive control valve 41 are collectively referred to as "work machine system control valves 42 through 44". Each of the actuators connected to the work machine system control valves 42 through 44 is not illustrated for the sake of simplicity.

The drive control valve 41 and the work machine system control valves 42 through 44 are connected in tandem through a center bypass passage 45. The work machine system control valves 42 through 44 are connected in parallel through a parallel passage 46.

The pump passage 22 and the parallel passage 46 communicate with each other by a connection passage 47 all the time. The passage 40 and the parallel passage 46 are connected by a passage 48. The passage 48 includes a check valve 49 for allowing a flow only from the parallel passage 46 to the passage 40.

A tank passage 50 guides tank ports of the respective control valves 23 through 27 arranged in the first circuit system to a tank. A tank passage 51 guides tank ports of the respective control valves 41 through 44 arranged in the second circuit system to the tank.

Figure 2:
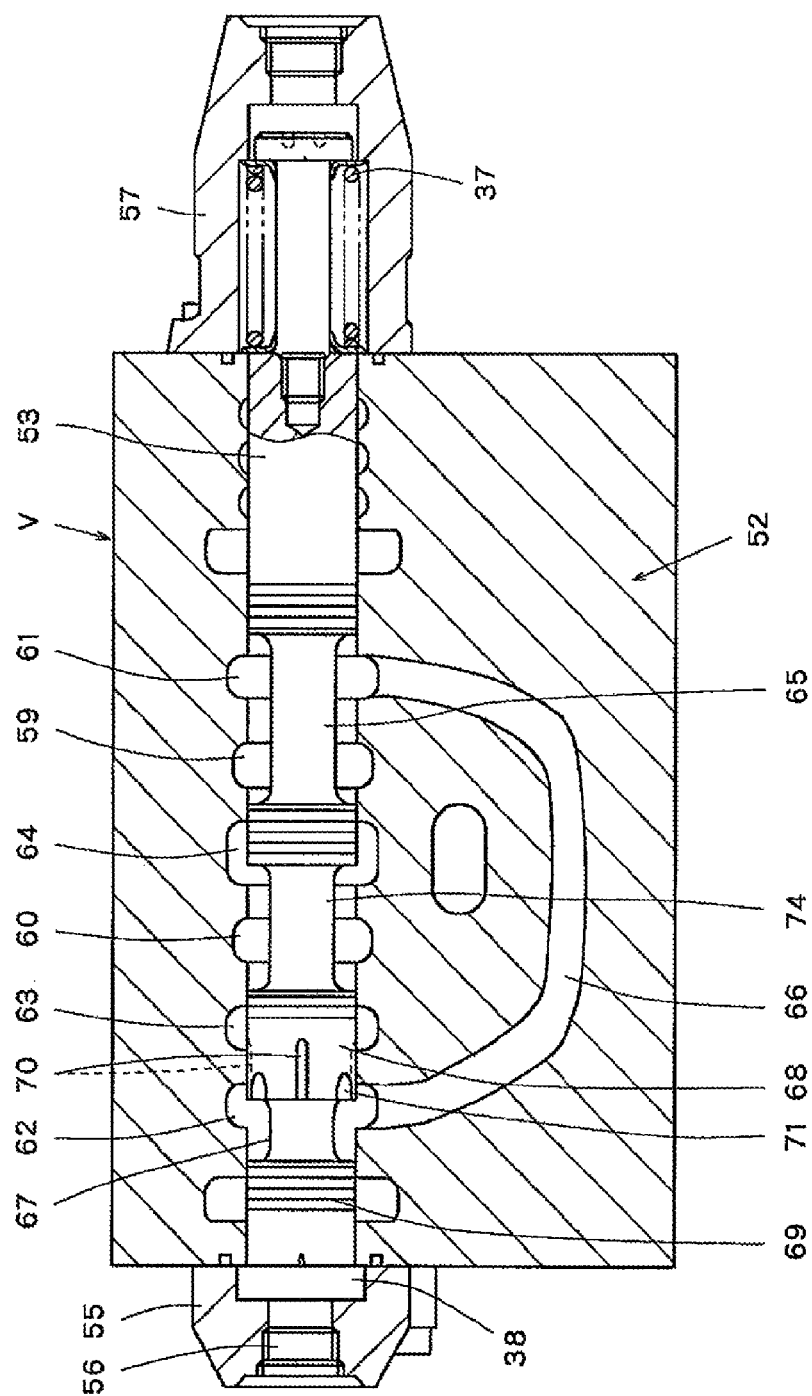
FIG. 2 is a cross sectional view of a travel control valve of FIG. 1.

FIG. 2 is a cross sectional view of the travel control valve V.

A spool 53 is slidably embedded into a valve body 52 of the travel control valve V, and one end of the spool 53 faces the pilot chamber 38. The pilot chamber 38 is formed inside a cap 55, and a pilot pressure is guided from a pilot port 56 formed in the cap 55. The pilot pressure applied when the rotation control valve 25 for controlling the rotation motor is switched is guided to the pilot chamber 38.

A cap 57 is arranged on the other end side of the spool 53, and the spring force of the spring 37 arranged inside the cap 57 acts on the spool 53. The spool 53 is held in a position on the right side illustrated in FIG. 1 by the spring force of the spring 37.

Moreover, the valve body 52 includes first through sixth annular grooves 59 through 64 which are spaced apart from one another in an axis line direction.

The first annular groove 59 communicates with the first pump port 33 illustrated in FIG. 1, and the second annular groove 60 communicates with the second pump port 34.

The third annular groove 61 is formed on an opposite side of the second annular groove 60 with the first annular groove 59 therebetween. The first annular groove 59 and the third annular groove 61 communicate with each other all the time through a first annular recessed portion 65 formed on the spool 53. Therefore, the third annular groove 61 also communicates with the first pump port 33 all the time.

The fourth annular groove 62 is formed on an opposite side of the first annular groove 59 with the second annular groove 60 therebetween. The fourth annular groove 62 communicates with the third annular groove 61 all the time through a bridge passage 66 formed in the valve body 52. Therefore, the fourth annular groove 62 communicates with the first pump port 33 illustrated in FIG. 1 all the time through the bridge passage 66, the third annular groove 61, the first annular recessed portion 65, and the first annular groove 59.

The fifth annular groove 63 is formed between the second annular groove 60 and the fourth annular groove 62. The fifth annular groove 63 communicates with the first connection port 35 illustrated in FIG. 1.

On the spool 53, moreover, a pair of lands 68 and 69 is formed, and a second annular recessed portion 67 is formed between the pair of lands 68 and 69. A plurality of long notches 70 and a plurality of short notches 71 are formed on an outer circumferential surface of the land 68. The long notch 70 and the short notch 71 communicate with the fourth annular groove 62 all the time. Moreover, when the spool 53 is in a normal position as illustrated in the figure, the long notch 70 communicates with the fifth annular groove 63, whereas the short notch 71 remains closed with respect to the fifth annular groove 63.

With the action of the pilot pressure guided to the pilot chamber 38, the spool 53 is moved against the spring force of the spring 37, and thus the short notch 71 communicates with the fifth annular groove 63 in addition to the long notch 70.

In a case where only the long notch 70 communicates with the fifth annular groove 63, the long notch 70 forms a small opening throttle 72 illustrated in FIG. 1. In a case where both of the long notch 70 and the short notch 71 communicate with the fifth annular groove 63, the long notch 70 and the short notch 71 form a large opening throttle 73 illustrated in FIG. 1.

The sixth annular groove 64 is formed between the first annular groove 59 and the second annular groove 60. The sixth annular groove 64 communicates with the second connection port 36 illustrated in FIG. 1. The second annular groove 60 and the sixth annular groove 64 communicate with each other all the time through a third annular recessed portion 74 formed on the spool 53 even if the spool 53 is in any position. Therefore, the second pump port 34 communicates with the second connection port 36 all the time through the second annular groove 60 and the sixth annular groove 64.

Herein, a control circuit of a power shovel in a comparative example is described with reference to FIGS. 3 through 6. In the description of the comparative example, components similar to the present embodiment are given the same reference numerals.

Figure 3:
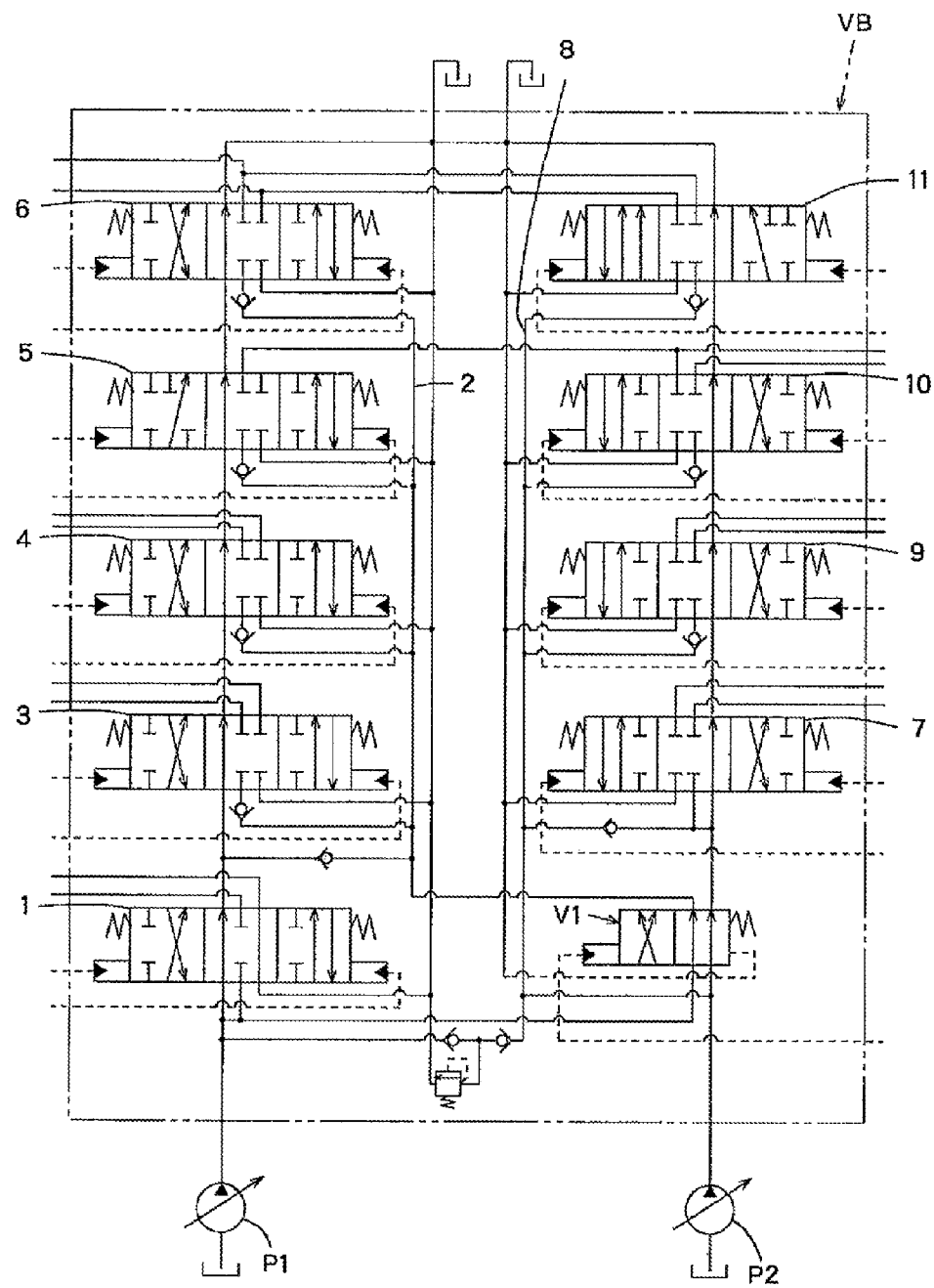
FIG. 3 is a circuit diagram of a power shovel including a crawler type travelling body in a comparative example.
Figure 4:
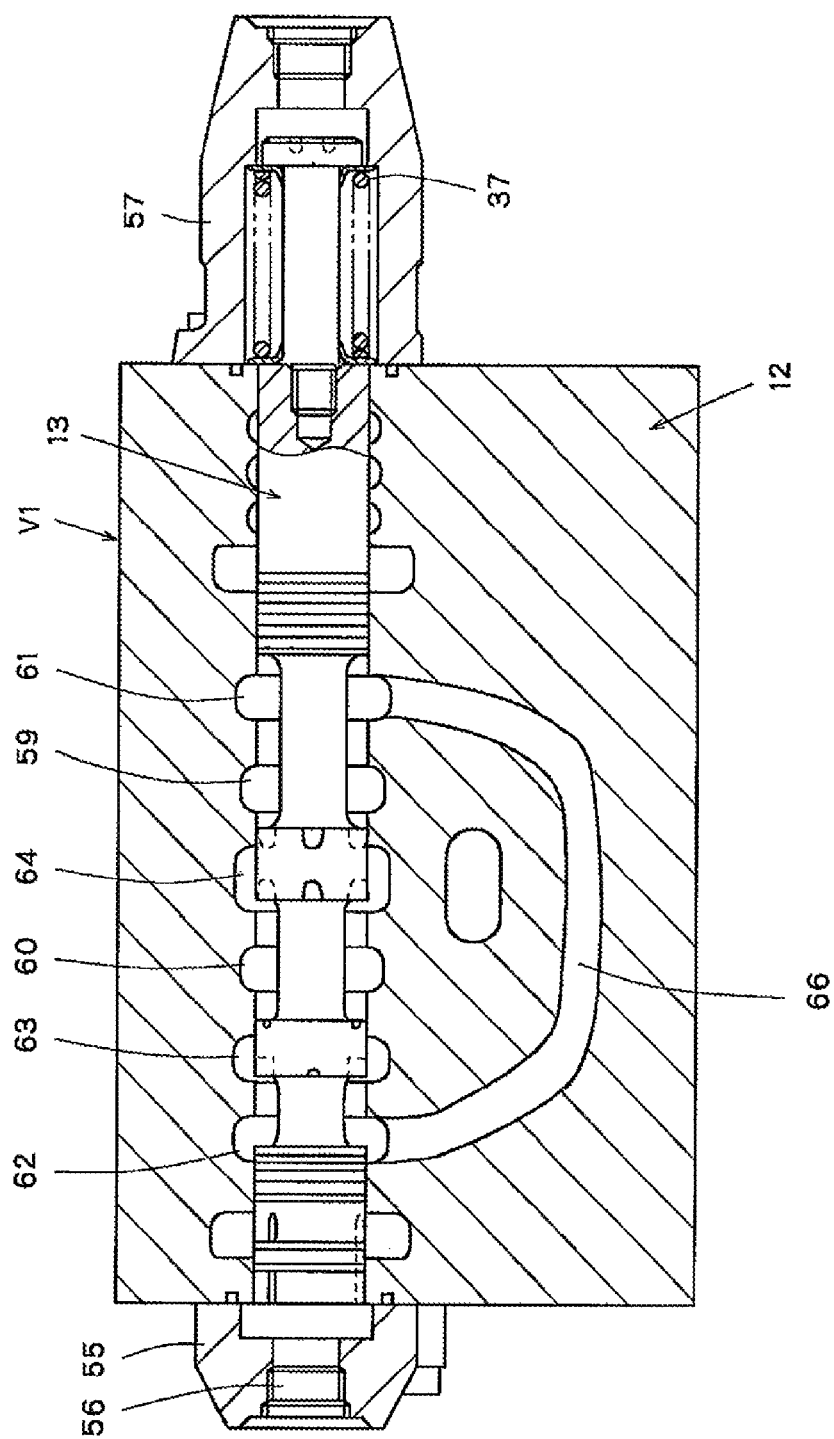
FIG. 4 is a cross sectional view of a travel control valve of FIG. 3.

In a case of a power shovel including a crawler type travelling body, a circuit illustrated in FIG. 3 and a travel control valve V1 illustrated in FIG. 4 are used.

As illustrated in FIG. 3, a valve block VB includes a first circuit system and a second circuit system. When the travel control valve V1 is in a position illustrated in the figure, a discharged fluid of a first pump P1 is guided to a drive control valve 1 arranged in the first circuit system, and guided to each of control valves 3 through 6 through the travel control valve V1 and a parallel passage 2 of the first circuit system. Moreover, a discharged fluid of a second pump P2 is guided to a drive control valve 7 through the travel control valve V1 arranged in the second circuit system, and guided to each of control valves 9 through 11 from an upstream side of the travel control V1 through a parallel passage 8.

When a position of the travel control valve V1 is switched to the left side in the figure, two drive control valves 1 and 7 are connected in parallel with respect to the first pump P1, and the parallel passage 2 of the first circuit system and the parallel passage 8 of the second circuit system are connected in parallel with respect to the second pump P2. Therefore, the discharged fluid of the first pump P1 is supplied only to the two drive control valves 1 and 7, and the discharged fluid of the second pump P2 is supplied to the control valves 3 through 6 and 9 through 11 for controlling actuators of work machine systems of the first circuit system and the second circuit system.

When a spool 13 embedded into a valve body 12 is in a position as illustrated in FIG. 4, the travel control valve V1 is positioned on the right side of the circuit diagram illustrated in FIG. 3, so that the actuator connected to each of the control valves 1, 3 through 6 of the first circuit system is operated by the discharged fluid of the first pump P1. Moreover, the actuator connected to each of the control valves 7, 9 through 11 of the second circuit system is operated by the discharged fluid of the second pump P2. When the spool 13 moves in a right direction in the figure, the travel control valve V1 becomes positioned on the left side of the circuit diagram illustrated in FIG. 3.

For the crawler type power shovel as described above and the wheel type power shovel which will be described below, control circuits for operating the actuators are embedded into the same valve block such that these power shovels have compatibility.

Figure 5:
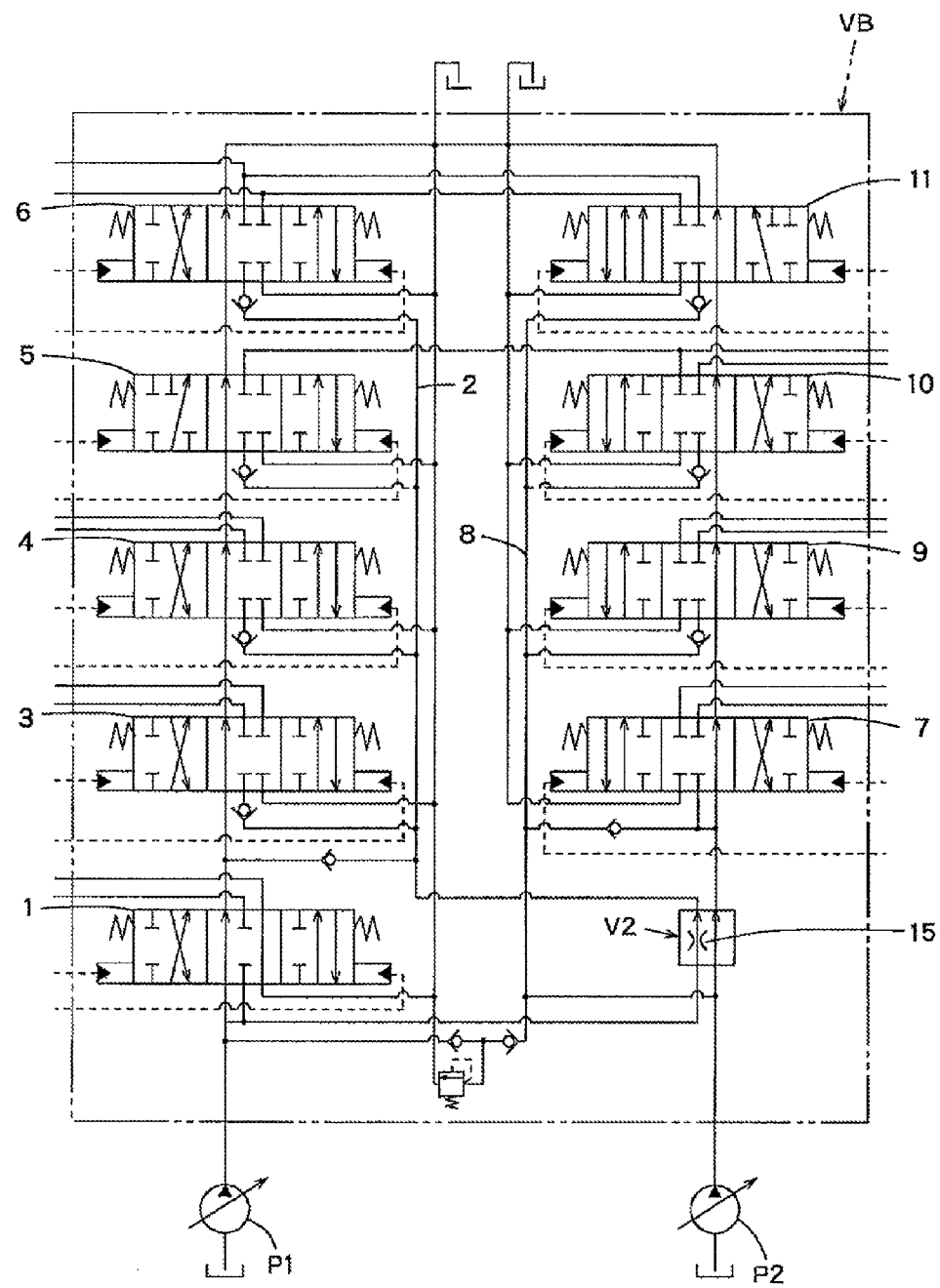
FIG. 5 is a circuit diagram of a power shovel including a wheel type travelling body in a comparative example.
Figure 6:
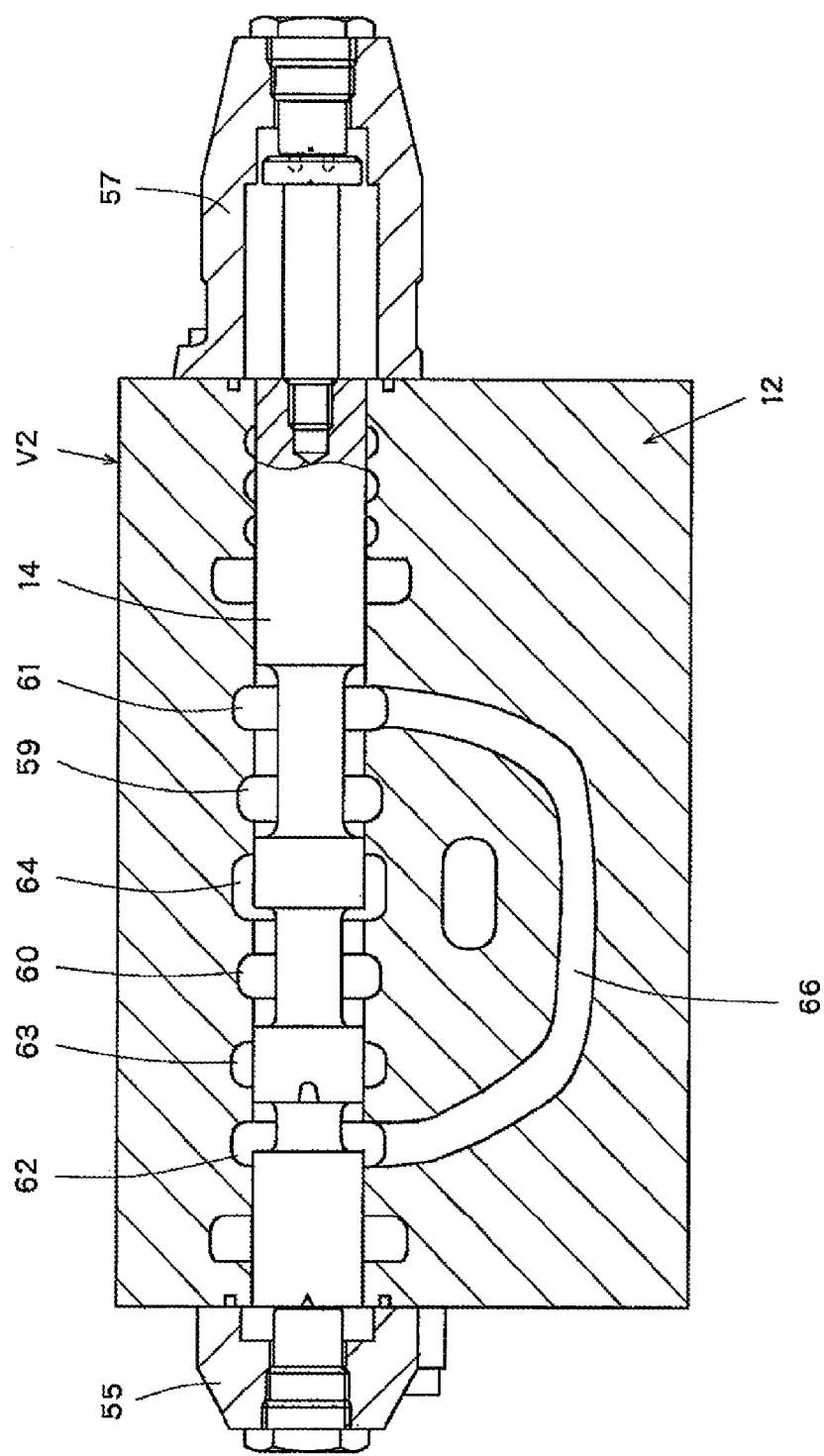
FIG. 6 is a cross sectional view of a travel control valve of FIG. 5.

That is, in a case of the power shovel using the wheel type travelling body, a circuit illustrated in FIG. 5 and a travel control valve V2 illustrated in FIG. 6 are used. Moreover, a fixed spool 14 illustrated in FIG. 6 is used. Consequently, the valve block VB can be shared for both of the power shovels.

As illustrated in FIG. 5, since the travel control valve V2 does not have a function of switching a flow path, the first pump P1 communicates with the parallel passage 2 and the drive control valve 1 arranged in the first circuit system all the time, whereas the second pump P2 communicates with the parallel passage 8 and the drive control valve 7 arranged in the second circuit system all the time.

In the travel control valve V2, the spool 14 embedded into the valve body 12 is fixed in a position as illustrated in FIG. 6. Thus, the travel control valve V2, as illustrated in a circuit diagram of FIG. 5, includes a throttle 15 in a passage from the first pump P1 to the parallel passage 2 arranged in the first circuit system, so that a flow in a passage from the second pump P2 to the drive control valve 7 arranged in the second circuit system becomes free.

As described, when the wheel type power shovel is travelling, the first pump P1 always communicates with the work machine system control valves 3 through 6 through the throttle 15 of the travel control valve V2. During the travel of the power shovel, therefore, the pressure fluid tends not to be supplied to an actuator having a large load. For example, since a load of the rotation motor is greater than that of the fluid pressure motor for travel, the pressure fluid does not tend to be supplied to the rotation motor if a rotation control valve 4 for controlling the rotation motor is switched during the travelling of the power shovel.

In the present embodiment, therefore, a position of the travel control valve V can be switched between the neutral position and the switching position as illustrated in FIGS. 1 and 2.

The discharged fluid of the second pump P2 is always guided to the drive control valve 41 and the parallel passage 46 even if the travel control valve V is switched to at any position.

On the other hand, the discharged fluid from the first pump P1 is guided to the drive control valve 23. Moreover, when the travel control valve V is in the neutral position, the discharged fluid from the first pump P1 is guided to the parallel passage 29 through the small opening throttle 72. When the travel control valve V is in the switching position, the discharged fluid from the first pump P1 is guided to the parallel passage 29 through the large opening throttle 73.

Next, an effect of the travel control valve V is described.

When the travel control valve V is in a right position as illustrated in FIG. 1, that is, when the spool 53 is in the normal position as illustrated in FIG. 2, the first pump port 33 communicates with the first connection port 35 through the first annular groove 59, the first annular recessed portion 65, the third annular groove 61, the bridge passage 66, the fourth annular groove 62, the second annular recessed portion 67, the long notch 70 formed on the land 68, and the fifth annular groove 63.

In this case, since the short notch 71 dose not communicate with the fifth annular groove 63, the first pump port 33 and the first connection port 35 communicate with each other through the small opening throttle 72 illustrated in FIG. 1. That is, the travel control valve V is in a small opening throttle position which is the right position in FIG. 1.

When the first pump port 33 and the first connection port 35 communicate with each other through the small opening throttle 72, a flow rate of the discharged fluid supplied through the passage 39 and the parallel passage 29 becomes relatively small. Thus, the discharged fluid of the first pump P1 is preferentially supplied to the fluid pressure motor connected to the drive control valve 23.

When the drive control valve 23 remains in the neutral position, that is, when the pressure fluid is not supplied to the fluid pressure motor for travel, and the power shovel is being stopped, the discharged fluid of the first pump P1 is guided to the parallel passage 29 through the passage 30. Accordingly, a pressure loss by the travel control valve V is not a problem for the supply of the discharged fluid to the work machine system control valves 24 through 27.

On the other hand, for example, if the rotation control valve 25 for controlling the rotation motor is switched while the power shovel is travelling, the pilot pressure at this time is guided to the pilot chamber 38 of the travel control valve V, and the spool 53 is moved to a right direction of FIG. 2 against the spring force of the spring 37.

The movement of the spool 53 allows the short notch 71 formed on the land 68 to communicate with the fifth annular groove 63 with the long notch 70. Consequently, a position of the travel control valve V is switched to a large opening throttle position which is a left position illustrated in FIG. 1.

When a position of the travel control valve V is switched to the large opening throttle position, the discharged fluid of the first pump P1 flows to the passage 39 and the parallel passage 29 through the large opening throttle 73. Consequently, an amount of the discharged fluid supplied to the passage 39 and the parallel passage 29 through the large opening throttle 73 is larger than that supplied through the small opening throttle 72.

Thus, even when the power shovel is travelling, sufficient pressure fluid is supplied to the rotation motor having a larger load than a travel motor. This enables the rotation motor to be reliably operated.

According to the present embodiment, therefore, the rotation motor having a relative large load can be reliably operated even when the power shovel is travelling while the compatibility between the valve block VB of the power shovel including the crawler type travelling body and the valve block VB of the power shovel including the wheel type travelling body is being maintained.

Embodiments of this invention were described above, but the above embodiments are merely examples of applications of this invention, and the technical scope of this invention is not limited to the specific constitutions of the above embodiments.

This application claims priority based on Japanese Patent Application No. 2012-068153 filed with the Japan Patent Office on Mar. 23, 2012, the entire contents of which are incorporated into this specification.

The invention claimed is:

1. A travel control valve used in a power shovel comprising:
    a first circuit system that is connected to at least one control valve for operating an actuator and connected to a drive control valve for controlling a fluid pressure motor for driving a wheel type travelling body on an uppermost stream;
    a first pump that is connected to the first circuit system and adapted to supply a working fluid;
    a second circuit system that is connected to at least one control valve for operating an actuator;
    a second pump that is connected to the second circuit system and adapted to supply a working fluid;
    a valve body; and
    a spool that is slidably arranged inside the valve body, wherein
    the valve body includes:
    a first pump port that is connected to the first pump on an upstream side from the drive control valve;
    a first connection port that communicates with the first pump port and is connected on a downstream side from the drive control valve of the first circuit system;
    a second pump port that is connected to the second pump; and
    a second connection port that communicates with the second pump port and is connected to the second circuit system, wherein
    a communication opening between the first pump port and the first connection port is switchable to a large opening throttle position in which the communication opening remains smaller than that between the second pump port and the second connection port and a small opening throttle position in which the communication opening remains even smaller than that in the large opening throttle position according to a slide position of the spool.

2. The travel control valve according to claim 1, wherein a plurality of notches is formed on the spool, and a throttle opening in the small opening throttle position and a throttle opening in the large opening throttle position are defined according to a total opening of the notches, the total opening being changed by sliding the spool.

3. The travel control valve according to claim 1, wherein the valve body includes:
    a first annular groove that communicates with the first pump port;
    a second annular groove that communicates with the second pump port;
    a third annular groove that is arranged on an opposite side of the second annular groove with the first annular groove therebetween;
    a fourth annular groove that is arranged on an opposite side of the first annular groove with the second annular groove therebetween;
    a fifth annular groove that is arranged between the second annular groove and the fourth annular groove to communicate with the first connection port;
    a sixth annular groove that is arranged between the first annular groove and the second annular groove to communicate with the second connection port; and
    a bridge passage that allows the third annular groove and the fourth annular groove to communicate with each other, wherein
    the spool includes an annular recessed portion that allows the first annular groove and the third annular groove to communicate with each other regardless of the slide position of the spool, and a plurality of notches that allow the fourth annular groove and the fifth annular groove to communicate with each other.

4. The travel control valve according to claim 3, wherein the spool includes:
    a first annular recessed portion as the annular recessed portion;
    a second annular recessed portion that allows the fourth annular groove and the fifth annular groove to communicate with each other;
    a pair of lands that forms the second annular recessed portion;
    a plurality of long notches that are formed around a land on the fifth annular groove side out of the pair of lands, and extend in an axial direction of the spool from the second annular recessed portion side; and a short notch that is formed on the land in which the long notch is formed, and has an axial length shorter than that of the long notch, wherein a small opening throttle is formed by opening only the long notch in the fifth annular groove if the spool is in a normal position, and a large opening throttle is formed by opening both of the long notch and the short notch in the fifth annular groove if the spool is slid and switched to a switching position by an action of a pilot pressure.

5. The travel control valve according to claim 1, further comprising:

a pilot chamber that faces one end of the spool and undergoes a pilot pressure guided thereto to switch a control valve for operating the actuator, wherein an action of the pilot pressure on the pilot chamber slides and switches the spool to the large opening throttle position.

* * * * *